(12) United States Patent
Berg et al.

(10) Patent No.: US 12,021,561 B1
(45) Date of Patent: *Jun. 25, 2024

(54) DATA PROVISIONING

(71) Applicant: CABLE TELEVISION LABORATORIES, INC., Louisville, CO (US)

(72) Inventors: John Berg, Arvada, CO (US); Jon Schnoor, Thornton, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 685 days.

This patent is subject to a terminal disclaimer.

(21) Appl. No.: 17/101,765

(22) Filed: Nov. 23, 2020

Related U.S. Application Data

(63) Continuation of application No. 14/788,653, filed on Jun. 30, 2015, now Pat. No. 10,848,244.

(51) Int. Cl.
*H04B 10/27* (2013.01)
*H04L 41/00* (2022.01)
*H04Q 11/00* (2006.01)
*H04L 61/5014* (2022.01)

(52) U.S. Cl.
CPC ............ *H04B 10/27* (2013.01); *H04L 41/00* (2013.01); *H04Q 11/0067* (2013.01); *H04L 61/5014* (2022.05); *H04Q 2011/0064* (2013.01)

(58) Field of Classification Search
CPC ..... H04B 10/27; H04L 41/00; H04L 61/5014; H04Q 11/0067; H04Q 2011/0064
See application file for complete search history.

(56) References Cited

U.S. PATENT DOCUMENTS

| | | | | |
|---|---|---|---|---|
| 9,287,982 | B2* | 3/2016 | Zang | H04Q 11/0067 |
| 2006/0101520 | A1* | 5/2006 | Schumaker | H04L 63/1433 |
| | | | | 726/25 |
| 2008/0232801 | A1* | 9/2008 | Arnold | H04L 41/0803 |
| | | | | 398/58 |
| 2009/0041458 | A1* | 2/2009 | Lin | H04L 12/2861 |
| | | | | 398/58 |
| 2009/0097861 | A1 | 4/2009 | Ikeda et al. | |
| 2010/0131663 | A1* | 5/2010 | Lee | H04W 8/26 |
| | | | | 709/228 |
| 2013/0089338 | A1 | 4/2013 | Silberman | |
| 2014/0023366 | A1 | 1/2014 | Zang et al. | |
| 2014/0093239 | A1* | 4/2014 | Griswold | H04Q 11/0067 |
| | | | | 398/45 |
| 2014/0140698 | A1* | 5/2014 | Hajduczenia | H04B 10/27 |
| | | | | 398/58 |
| 2014/0334822 | A1* | 11/2014 | Hajduczenia | H04L 41/0806 |
| | | | | 398/58 |
| 2016/0359693 | A1* | 12/2016 | Carter | H04Q 11/0062 |
| 2017/0117965 | A1* | 4/2017 | Fujino | H04B 10/03 |

* cited by examiner

*Primary Examiner* — Siren Wei
(74) *Attorney, Agent, or Firm* — Josh C. Snider; Snider IP

(57) ABSTRACT

Provisioning of Internet Protocol (IP) configuration data or other configuration related data for devices or services connected to a passive optical network (PON) is contemplated. The provisioning may be facilitated with an optical line terminal (OLT) providing the desired configuration data over the PON to an optical network unit (ONU) connected to the device or service desired for provisioning, such as to enable the ONU to provision the device or service without exchanging Dynamic Host Configuration Protocol (DHCP) messaging with a DHCP server.

15 Claims, 5 Drawing Sheets

DATA PROVISIONING

CROSS-REFERENCE TO RELATED APPLICATION

This application is a continuation of U.S. patent application Ser. No. 14/788,653, filed Jun. 30, 2015, which application is incorporated herein by reference in its entirety.

TECHNICAL FIELD

The present invention relates to obtaining Internet Protocol (IP) configuration data or other configuration related data for devices or services within a passive optical network (PON), such as but not necessarily limited to obtaining IP configuration data for optical network units (ONUs) and/or the devices/services associated therewith.

BACKGROUND

Data Over Cable Service Interface Specification (DOCSIS) Provisioning of EPON (DPoE) version 2.0 specifications (periodically referred to as the DPoE specifications) are a joint effort of Cable Television Laboratories (CableLabs), cable operators, vendors, and suppliers to support EPON technology using DOCSIS-based back-office systems and processes. DPoE v2.0 specifications augment the DPoE v1.0 specifications to provide requirements for additional service capabilities and corresponding provisioning and network management capabilities.

One Ethernet PON (EPON) is defined in Institute of Electrical and Electronics Engineers (IEEE) standard 802.3, the disclosure of which is hereby incorporated by reference in its entirety herein. EPON may be considered as a passive optical network (PON) or a multi-access optical network relying on an optical fiber based network technology that permits more than two network elements to transmit and receive on the same fiber. DPoE specifications are focused on DOCSIS-based provisioning and operations of Internet Protocol (IP) using DOCSIS Internet service (which is typically referred to as High Speed Data (HSD)), or IP(HSD) for short, and Metro Ethernet services as described by Metro Ethernet Forum (MEF) standards. DPoE Networks offer IP(HSD) services functionally equivalent to DOCSIS networks, where the DPoE System acts like a DOCSIS CMTS and the DPoE System and DPoE Optical Network Unit (ONU) together act like a DOCSIS CM.

The EPON protocol, IEEE 802.3ah, the disclosure of which is hereby incorporated by reference in its entirety herein, and the amendment for 10G-EPON, IEEE 802.3av, the disclosure of which is hereby incorporated by reference in its entirety herein, support a point-to-multipoint architecture with a centralized controller called an Optical Line Terminal (OLT) and distributed low cost Layer 2 ONUs. The basic service mapping architecture in EPON is to map Ethernet (or IP) frame header information (e.g., addresses, IP DiffServ Code Points, Ethernet Q tag, S-VLAN/C-VLAN ID, ISID, bridge address, etc.) to a logical circuit called a Logical Link Identifier (LLID), such as that described in IEEE 802.3ah, the disclosure of which is hereby incorporated by reference in its entirety herein. The service function is similar to that used in DOCSIS networks in many ways because it is based on a centralized scheduler and uses an LLID which functions like an SID, supports both unicast and broadcast, and has other similarities.

Experience with lab testing, field trials, and deployments has shown 1G-EPON OLT and ONU systems typically only interoperate with a single port ONU. This is because IEEE 802.3ah specifies the interfaces on the PON (the DPoE TU interface) but does not specify any of the other system interfaces. The challenge is that neither 1G-EPON nor 10G-EPON specify OAMP to forward traffic between Network to Network Interface (NNI) ports (I-NNI for MEF or NSI for L2VPN or IP(HSD)) and the PON, or UNI ports and the PON. The challenge for EPON is that the remote device (the ONU) cannot be reached, and therefore cannot be configured. One non-limiting aspect of the present invention contemplates a solution to this problem based on developing a common (standard) method of reaching the controller for the ONU, identifying the ONU capabilities, and/or providing that information to the OLT so that it can configure the ONU to forward traffic.

Traditional network management architecture requires the ONU to support the appropriate network management protocol or protocols. The protocol is usually SNMP, and hence would require IP layer connectivity. This requirement can result in extensive network maintenance to support every ONU on the management network at layer 3 (L3). An IP address would be assigned on the service provider's management network to each connected ONU, and ARP/RARP/DHCP issues must be addressed, as well as L3 security over the management channel. L3 management also places a larger burden on the ONU software stack, resulting in greater cost in the high-volume components of the network. One non-limiting aspect of the present invention contemplates the DPoE management architecture terminating network-side management protocols at the DPoE System and carrying out management functions over the TU interface using OAM and/or other Layer 2 operations.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
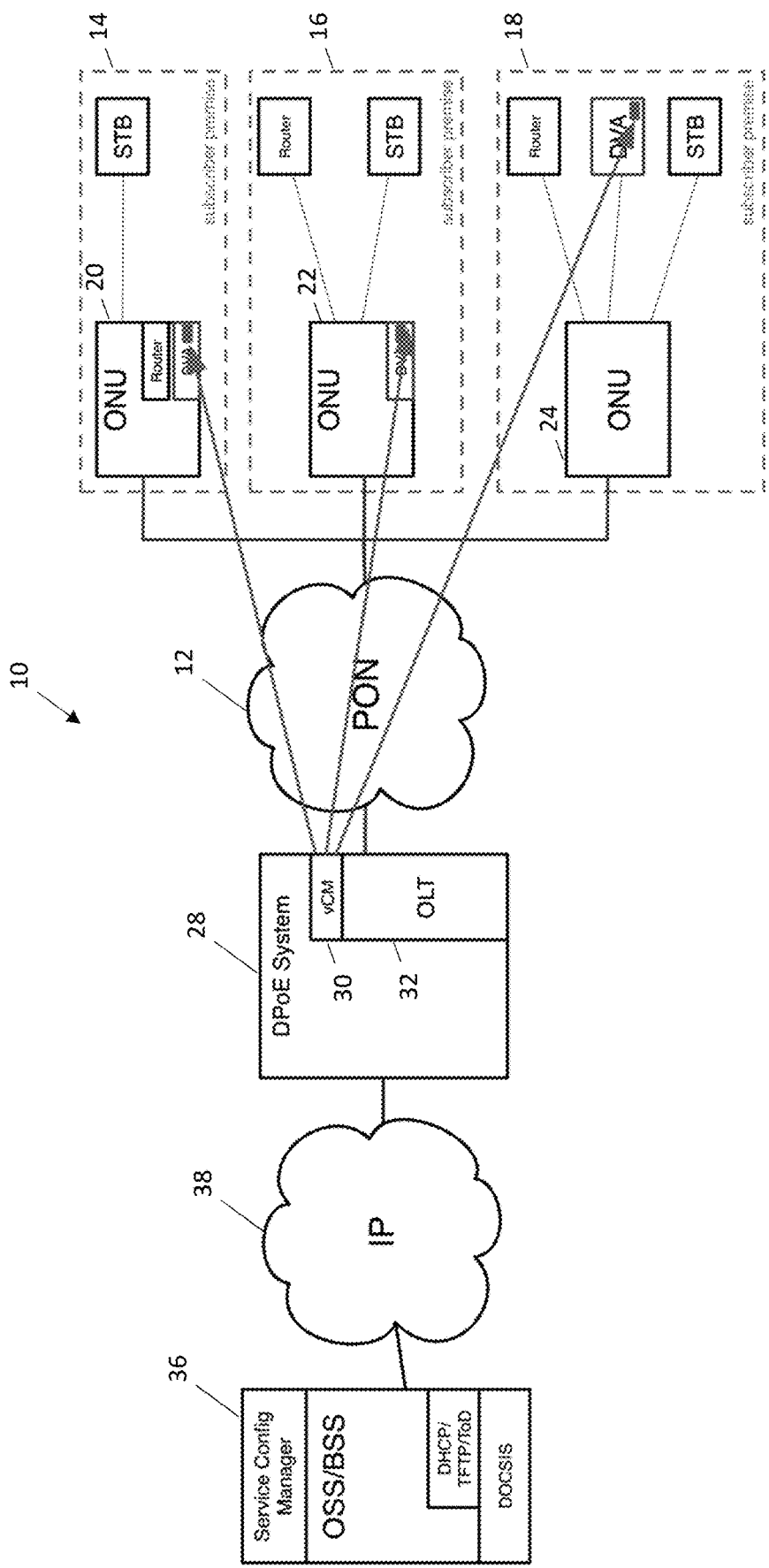
FIG. 1 illustrates a provisioning system in accordance with one non-limiting aspect of the present invention.

FIG. 1 illustrates a provisioning system 10 in accordance with one non-limiting aspect of the present invention. The system 10 may be utilized to provision data or other information, generically referred to as configuration data, for one or more devices, such to facilitate programming, defining, enabling, controlling or otherwise manipulating the operation thereof. The present invention is predominately described for exemplary purposes with respect to relying at least partially on a Passive Optical Network (PON) or Ethernet PON (PON) 12, such as that described in IEEE 802.3 to facilitate delivery of the configuration data to the one or move devices prior to the one or more devices establishing Internet Protocol (IP) communications or otherwise becoming fully operational according to their intended operation, e.g., to provide configuration data needed to for devices to activate, authenticate or operate properly upon connection or deployment. The present invention may be beneficial with multiple system operators (MSO), television service providers, Multichannel Video Programming Distribution (MVPD) providers, high-speed data (HSD) providers, Internet Service providers (ISPs), cellular telephone providers, VoIP providers and/or virtually any other provider, service or entity tasked with provisioning devices.

The system 10 is shown for exemplary purposes with respect to the devices being a router, a digital voice adapter (DVA) and/or a set-top box (STB) for non-limiting purposes as the present invention fully contemplates its use and application in provisioning virtually any type of device and/or capability, service or entitlement associated therewith, including provisioning computers, mobile phones, media terminal adapters (MTAs), wireless access points, televisions, tablets and the like, which may be deployed to or otherwise associated with a premise 14, 16, 18 of a subscriber or other entity. An optical line unit (ONU) 20, 22, 24 may be associated with each of the premises 14, 16, 18 to facilitate interconnecting corresponding ones of the devices with the PON 12. A portion of the devices are shown to be included as part of or resident on the corresponding ONU 20, 22, 24 and a portion of the devices are shown to be standalone or otherwise distinct from the corresponding ONU 20, 22, 24. The ONUs 20, 22, 24 may be configured to interface and exchange optical signaling with the PON 12, including having capabilities commensurate with being characterized as a layer 2 (L2) device and/or other construct operable to facilitate Operations Administration and Maintenance (OAM) messages and/or other optical messaging in accordance with the DPoE specifications and/or IEEE 802.3.

A DPoE system 28 may be configured in accordance with the present invention to facilitate provisioning one or more of the corresponding devices using signaling sufficient for communicating instructions, messages, signals, etc. with the ONUs 20, 22, 24 via the PON 12. The DPoE system 28 is shown for exemplary purposes to illustrate one use of the provisioning system to enable a virtual cable modem (vCM) 30 to handle all the OAMP functions for DOCSIS as described in DPoE Operations and Support System Interface Specification DPoE-SP-OSSIv1.0-I08-140807, DPoE Metro Ethernet Forum Specification DPoE-SP-MEFv2.0-I03-140807, DPoE Metro Ethernet Forum Specification DPoE-SP-MEFv2.0-I03-140807, DPoE Metro Ethernet Forum Specification DPoE-SP-MEFv2.0-I03-140807, DPoE OAM Extensions Specification DPoE-SP-OAMv2.0-I06-140807, DPoE Security and Certificate Specification DPoE-SP-SECv2.0-I02-130808, referred to herein as the DPoE specifications, the disclosures of which are hereby incorporated by reference in their entireties herein.

The vCM 30 can proxy requests, signaling, and messages to the ONUs using EPON OAM messages defined in DPoE-OAMv2.0. The DPoE system 28 may include an optical line termination (OLT) 32 operable with the vCM 30 to facilitate the provisioning messaging and/or other interactions with the ONUs 20, 22, 24. The OLT 32 may be characterized as a layer 2 device and/or other construct operable to facilitate OAM messages and/or other optical messaging in accordance with the DPoE specifications and/or IEEE 802.3. One non-limiting aspect of the present invention contemplates the DPoE system re-using the IEEE 802.3 Clause 57 OAM packet format, as described in the DPoE specifications, such that the ONU 20, 22, 24 need not necessarily support additional protocol families for every possible management protocol, which may be beneficial in simplifying implementation and limiting interoperability problems.

A service configuration manager 36 having an operating support system (OSS) or business support (BSS) may be configured to facilitate operation of the system. The OSS/BSS may include servers or other capabilities sufficient to facilitate DHCP, Trivial File Transfer Protocol (TFTP), time of day (ToD) and/or DOCSIS. An IP network 32 may be configured to facilitate communications between the service configuration manager and the OLT 32 (the service configuration manager may manage any number of OLTs and the devices, etc. downstream thereof). The DPoE system 28 and associated networking may appear to outside systems (CPE and the operator OSS) to act like a DOCSIS system with a CMTS and attached CMs. IP interfaces on the DPoE System 28 act like those on a DOCSIS CMTS so as to enable the OLT 32 and/or ONUs 20, 22, 24 to provide the same service capabilities as a CM. One non-limiting aspect contemplates provisioning the devices when one or more of the ONUs 20, 22, 24 lack an IP software stack or otherwise lack the resources to operate as a CM, such as when the ONUs 20, 22, 24 are unable to perform Dynamic Host Configuration Protocol (DHCP). The lack of an IP stack is both an additional security advantage and an economic advantage of EPON technology. Operators specifically want to avoid bifurcating the EPON ONU market and specifically want to take advantage of the benefits of scale in manufacturing and support of EPON ONU products and technologies.

Since all traffic going to an ONU 20, 22, 24 from the OSS 36 passes through the DPoE System 28, it is possible for the DPoE System 28 to perform the IP layer functions of a CM. The DPoE System 28 is shown to instantiate a vCM 30 for each registered ONU 20, 22, 24. The vCM 30 may be configured to handle all the OAMP functions for DOCSIS as described in DPoE-MULPIv2.0 and DPoE-OSSIv2.0. The vCM 30 can proxy requests, signaling, and messages to the ONU using EPON OAM messages defined in DPoE-OAMv2.0. The vCM model applies to the ONU 20, 22, 24 and optionally not to other embedded components that may be present in the ONU 20, 22, 24. eDOCSIS devices, such as described in eDOCSIS Specification CM-SP-eDOCSIS-127-140403, the disclosure of which is hereby incorporated by reference in its entirety herein, if present, may use an IP stack on the ONU for all other DOCSIS services beyond CMCI based services, which includes Embedded Digital Voice Adapter (eDVA), eRouter, or any other eSAFE subsystem within a ONU 20, 22, 24, i.e., the ONU 20, 22, 24 or elements in communication therewith may include capabilities sufficient to facilitate layer 3 operations while the ONU 20, 22, 24, or its interaction with the OLT 32 and/or vCM 30, may be limited to layer 2. As described below in more detail, one non-limiting aspect of the present invention contemplates the vCM/OLT 30, 32 facilitating provision of the ONU 20, 22, 24 using OAM and/or layer 2 messaging so as to enable the ONUs 20, 22, 24 to provision the devices associated therewith.

Figure 2:
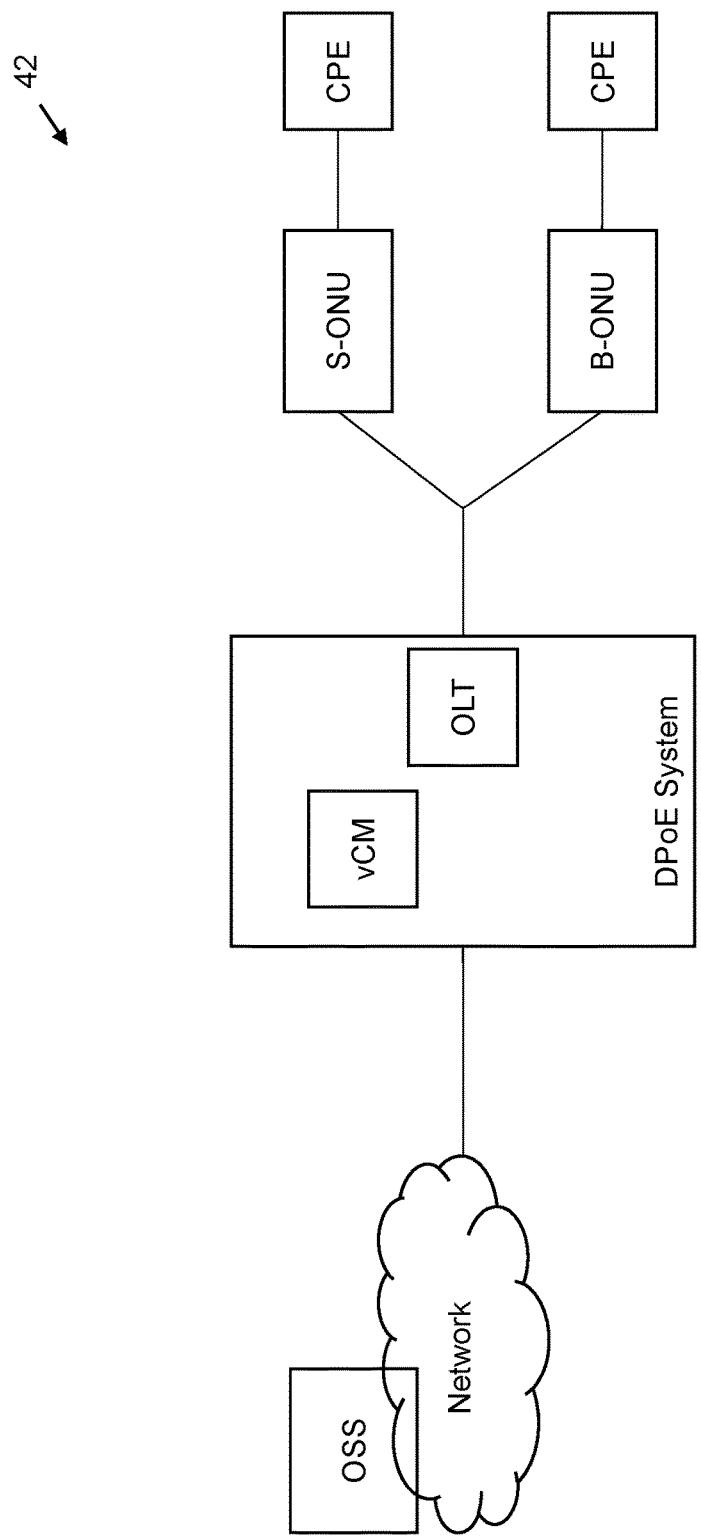
FIG. 2 illustrates a DPoE reference architecture in accordance with one non-limiting aspect of the present invention.

FIG. 2 illustrates a DPoE reference architecture 42 in accordance with one non-limiting aspect of the present invention. The architecture 42 is shown to identify the elements that a DPoE Network may minimally require to illustrate and communicate the physical hardware and logical software interfaces between the functional subsystems of the DPoE architecture. The principal elements in the architecture are the DPoE System that resides in the headend or hub site, and the DPoE ONU (D-ONU) which may be an off-the-shelf EPON ONU, EPON SFPONU, or an EPON ONU with additional subsystems. The remaining elements in the architecture are existing servers and systems in the operator's network. All the server elements have connectivity through an IP (TCP/IP) network. Transport of bearer traffic, and (in some cases) Layer 2 OAM Protocol Data Units (PDUs) are available through either IP or Layer 2 Ethernet-based Network Interfaces.

Figure 3:
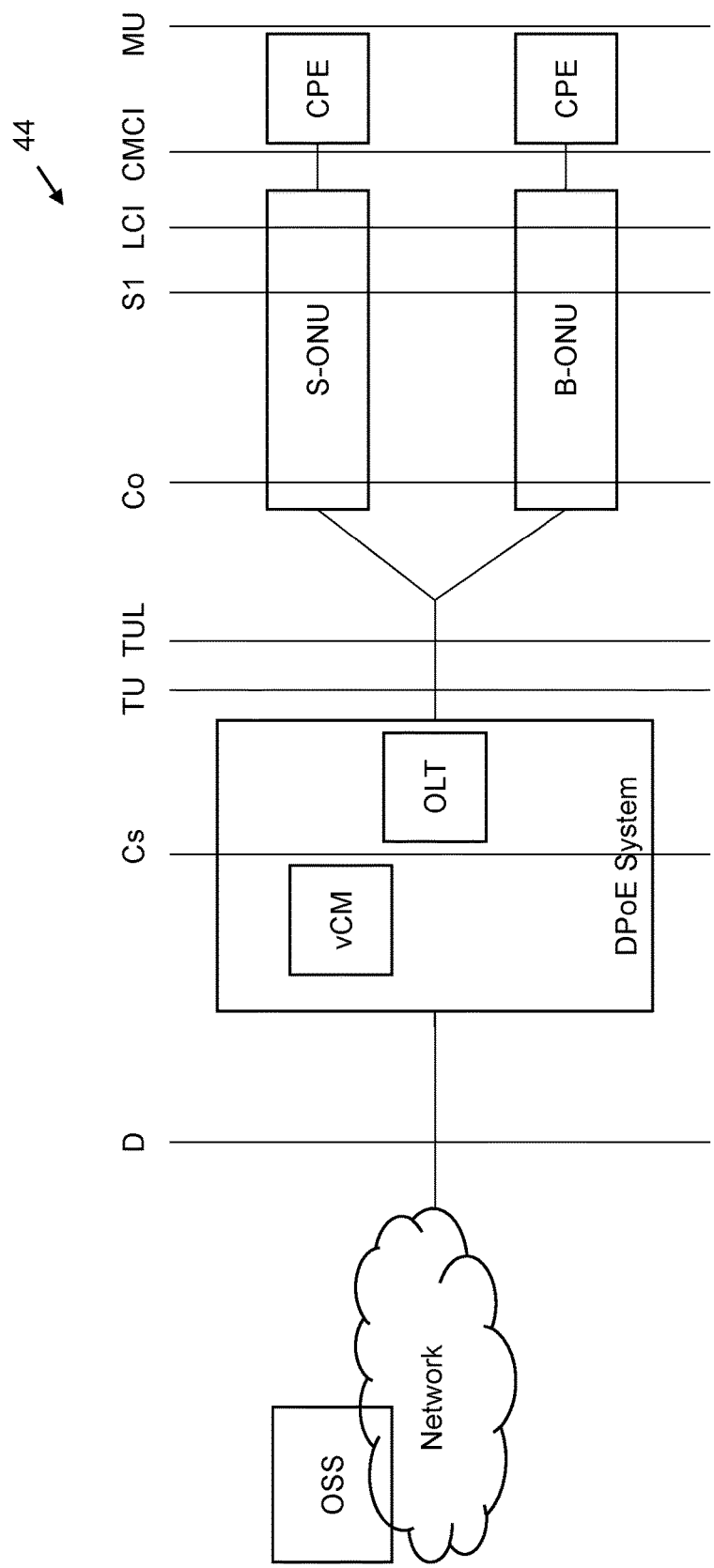
FIG. 3 illustrates a DPoE interface diagram in accordance with one non-limiting aspect of the present invention.

FIG. 3 illustrates a DPoE interface diagram 44 in accordance with one non-limiting aspect of the present invention. The DPoE interfaces and reference points shown provide a basis for the description and enumeration of DPoE specifications for the DPoE architecture. Each interface or reference point indicates a point between separate subsystems. The reference points have protocols that run across them, or have a common format of bearer traffic (with no signaling protocol). All the interfaces are bi-directional interfaces that support two-way communications. The protocols in DPoE specifications operate within different layers based on the IEEE 802.3, IEEe 802.1, IETF, MEF, and CableLabs specifications, the disclosures of which are hereby incorporated by reference in their entireties herein. The C reference points are uni-directional for upstream (CO) or downstream (CS) classification, respectively. Operation of the interfaces associated with the diagram are described in the following table.

| Interface or Reference Point | | Interface or Reference Point Description |
|---|---|---|
| MN | | MN is a logical concept used for the specification of requirements for MEF INNI that apply to both $MN_E$ and $MN_I$. MN logically provides the equivalent function of a MEF INNI or L2VPN NSI. It is an NNI for Metro Ethernet services only. |
| | $MN_E$ | The $MN_E$ (MEF INNI External) interface is a substitute for the MN reference interface from DPoE version 1.0 specifications. The MN interface is an [802.3] interface for Ethernet (or MEF or L2VPN emulated) services only. It serves the role of a MEF INNI or L2VPN NSI. It is an NNI for Metro Ethernet services only. |
| | $MN_I$ | The $MN_I$ reference interface is used to describe the virtual interface between an OLT and a VPLS Virtual Switch Instance (VSI). In particular, it is used to describe the requirements for stitching VSIs to DPoE System and OLT [802.1] components such as [802.1d] bridge groups, [802.1ad] S-VLAN or C-VLAN (S-component or C-component), or [801.1ad] I-BEB (I-component) or B-BEB (B-component) backbone edge bridges. The DPoE System stitches VPLS and VPWS transport and forwarding for Metro Ethernet Services between the D interface and the $MN_I$ reference interface[2]. |
| D | | The D interface is the DOCSIS IP NNI interface. It is an operator network-facing interface, sometimes called a Network Systems Interface (NSI) in DOCSIS specifications. The D interface allows a DPoE System to communicate with an IP network. The D interface carries all IP management traffic including OSSI and IP NE traffic. The D interface carries all DOCSIS IP service traffic. IP/MPLS/VPLS traffic, and IP/MPLS/VPWS traffic. |
| TU | | The TU interface is the interface between the DPoE System and the D-ONU. |
| TUL | | The TUL interface is a virutal interface representing a logical EPON on an ODN. Each ODN has at least one TUL, and each TUL represents a MAC domain. |
| C | | The C reference point is used for explanation of traffic ingress to a DPoE classifier. |
| | $C_o$ | The $C_o$ reference point is used for explanation of traffic ingress to a D-ONU upstream classifier. |
| | $C_s$ | The $C_s$ reference point is used for explanation of traffic ingress to a DPoE System downstream classifier. |
| S | | The S interface is an IEEE 802 interface. The S interface may be an internal interface, such as [802.3] across a SERDES (GMII or XGMII) interface in a BP-ONU (such as an SFP-ONU, SFP + ONU or XFP-ONU), or it may be an external Ethernet interface in a BB-ONU or S-ONU.<br>$S_1$ is an interface for an S-ONU. $S_2$ is a reference point used for explanation of services with the B-ONU. |
| | $S_1$ | The $S_1$ interfaces are the general case of all interfaces on an S-ONU. $S_1$ interfaces may be CMCI, LCI , MI, or MU interfaces. |
| | $S_2$ | The $S_2$ reference point is used for explanation of traffic ingress to and egress from interfaces on a DEMARC device in a DPoE System. Although there are no specifications or requirements for the $S_2$ reference point, informative text refers to the $S_2$ reference point to provide the full context for the use of a B-ONU with a DEMARC device providing Metro Ethernet services. |
| LCI | | The ogical CPE Interface (LCI) interface is an eDOCSIS interface as defined in [eDOCSIS]. eSAFEs are connected to LCI interfaces. |
| CMCI | | CMCI is the DPoE interface equivalent of the DOCSIS Cable Modem CPE Interface as defined in [CMCIv3.0]. This is the service interface for DOCSIS-based IP services. Customer Premise Equipment (CPE) is connected to CMCI interfaces. |
| MI | | MI is an S interface that operates as a MEF INNI with additional requirements as specified in [DPoE-MEFv2.0]. The MI interface is an [802.3] interface (or reference point) between a D-ONU and a DEMARC device.<br>A D-ONU that provides a MEF INNI has an MI interface.<br>A D-ONU can have MU as an interface and an MI reference point on different S interfaces in a single D-ONU.<br>DEMARC devices are connected to MI interfaces. |

| Interface or Reference Point | Interface or Reference Point Description |
|---|---|
| MU | MU is an S interface (or S reference interface) that operates as a MEF UNI. The MU reference interface is an [802.3] interface (or reference point) between a D-ONU or a DENMARC device and a customer's equipment.<br>A D-ONU that directly provides a MEF UNI (MU) interface has MU as an interface.<br>A D-ONU can have MU as an interface and an MI reference point on different S interfaces in a single D-ONU.<br>Customer Edge (CE) devices are connected to MU interfaces. |

Figure 4:
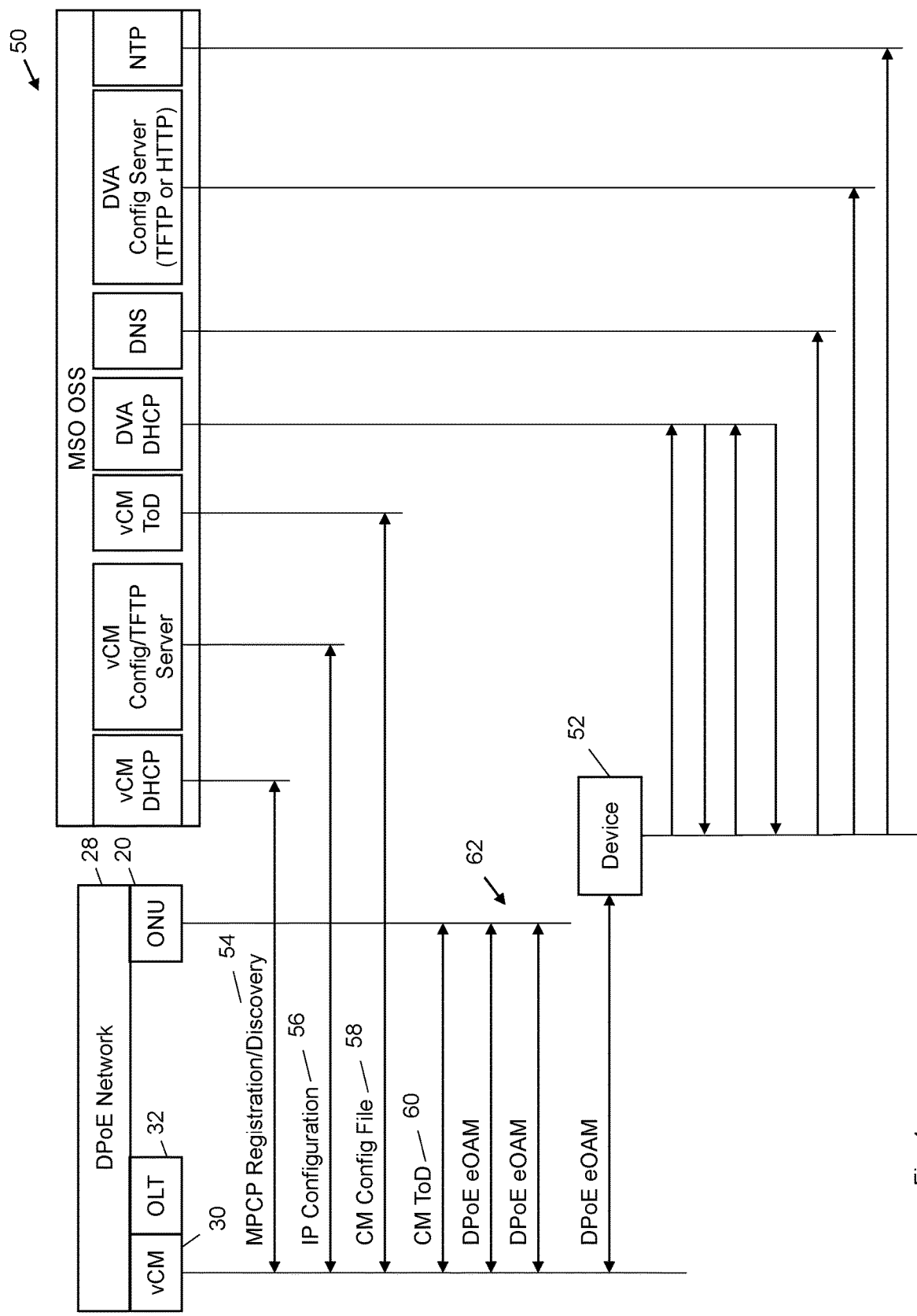
FIG. 4 illustrates a messaging diagram in accordance with one non-limiting aspect of the present invention.

FIG. 4 illustrates a messaging diagram 50 in accordance with one non-limiting aspect of the present invention. The messaging diagram 50 illustrates one exemplary use of the present invention to facilitate provisioning a DVA (device) 52 included on or separately connected to an ONU 20. The contemplated provisioning generally relates to providing the DVA configuration data prior to the DVA 52 becoming operational, such as to facilitate providing the DVA configuration data needed after being connected to the ONU 20 in order to boot or otherwise establish connections necessary for use within the system. The provisioning may be characterized as a pre-operational process where configuration data is provided to a memory or other construct of the DVA 52 so as to enable the DVA 52 to thereafter perform additional processing, loading, programming, etc. based at least in part on the configuration data, thereby becoming fully operational. One non-limiting aspect of the present invention contemplates the configuration data providing IP addressing and/or other IP information to the DVA 52 without requiring the ONU 20 to obtain the corresponding configuration data on behalf of the DVA 52 using IP communications, DHCP and/or layer 3 operations.

The contemplated provisioning of the DVA 52 via the ONU 20 enables the present invention to support Network function Virtualization (NfV), Software Defined Networking (SDN) and/or other virtualization in the cloud or through resources upstream of the subscriber premise. The capabilities of the present invention may be particularly advantageous for enabling use of a vCM 30 to emulate DOCSIS provisioning of the DVA 52 or other devices connected to the ONU 20 via an OLT 32. The provisioning process may begin with a Multi-Point Control Protocol (MPCP) or other registration/discovery process 54 whereby the OLT 32 identifies one or more ONUs 20 desiring service and/or other parameters associated with the ONU 20, devices and other provisioning needs of the newly discovered ONU 20. An IP configuration process 56 may be performed upon determining a need to provide virtual operations or the ONU 20 according to information uncovered as part of the registration process. The IP configuration process 56 relates to the OLT 32 determining a need to implement a vCM 30 on behalf of the ONU 20 and thereafter communicating with a vCM DHCP to retrieve addressing information for a vCM configuration/TFTP server (or other provisioning agent if another service is virtualized).

The IP configuration process 56 assigns an IP address to the vCM 30 as well as a Domain Name System (DNS) or locator for the vCM server. A configuration process 58 commences between the OLT/vCM 32, 30 and the vCM server where a CM configuration filed is downloaded. The CM configuration file may include a plurality of type-length-values (TLVs) for provisioning the vCM functionality as described in the DPoE specifications. One non-limiting aspect of the present invention contemplates including an address TLV and/or additional ONU TLVs within the CM configuration to facilitate provisioning of the DVA 52 or other device associated with the ONU 20. The address TLV may be used to specify a primary and secondary IP address for a DVA DHCP server (e.g., DHCP server TLVs) or other information needed by the DVA prior to activation. The Primary and Secondary DHCP server TLVs may provide the ONU 20 with its primary and secondary DHCP server addresses. These may be an equivalent of DHCP Option 122 sub-option 1 and sub-option 2 values as specified in IETF RFC 3495, the disclosure of which is hereby incorporated by reference in its entirety herein.

The OLT 32 may be required to support the encoding and delivery of TLV 220 (or the like) values to client devices, e.g. ONU 20. The ONU 20 may support the transfer of TLV 220 values to the DVA client. Encoding of the TLV 220 or other TLV may be defined according to the eDOCSIS specification. TLV 220 may be represented as follows:

| Subtype | Length | Value |
|---|---|---|
| 220.1 | 4 (IPv4) or 16 (IPv6) | Primary DHCP Server IP Address |
| 220.2 | 4 (IPv4) or 16 (IPv6) | Secondary DHCP Server IP Address |

The OLT 20 may parse the CM configuration file and exchange corresponding DPoE OAM messages 62 with the ONU 20 for configuring the operation thereof (various TLVs may be used to configure any number of parameters, etc.). One or more of the OAM messages may include TLV 220 or other representation of the primary and secondary DHCP server IP addresses. The ONU 20 may then program a management information base (MIB), store the primary secondary DHCP server IP addresses on a memory of the DVA 52 or perform other operations suitable to apprising the DVA 52 of the IP addressing information for its appropriate DHCP server. The DVA 52 may then utilize its IP stack to perform a number of provisioning operations, which are shown for exemplary purposes to correspond with interactions 64 performed with a DVA DHCP server, a DNS server, a DVA configuration server and a network timing protocol server (NTP). The operations performed by the DVA 52 or other device provisioned in accordance with the present invention may take many forms and vary depending on the capabilities and operations of the device.

The DHCP server information needed by the DVA 52 or other provisioned device may be parsed from the CM configuration file and thereafter delivered to the DVA/device through OAM messaging 62. The message exchange and programming or other delivery of the TLV parsed from the CM configuration file may be performed through messages 62 exchanged over the PON such that the provisioning process may be entirely performed without requiring the ONU 20 to have an IP stack or otherwise perform layer 3 operations. This capability may be preferable with optical networking as it can enable the use of lower-cost or more efficient ONUs 20 and/or limit processing requirements and IP address tracking burdens on the OSS. Providing DHCP server information without requiring the providing device 20 to support DHCP may be advantageous as described in the DPoE systems 28 as well as other systems operating according to other standards and protocols, i.e., the present invention may be suitable for use with devices other than ONUs lacking an IP stack or DHCP capabilities.

Figure 5:
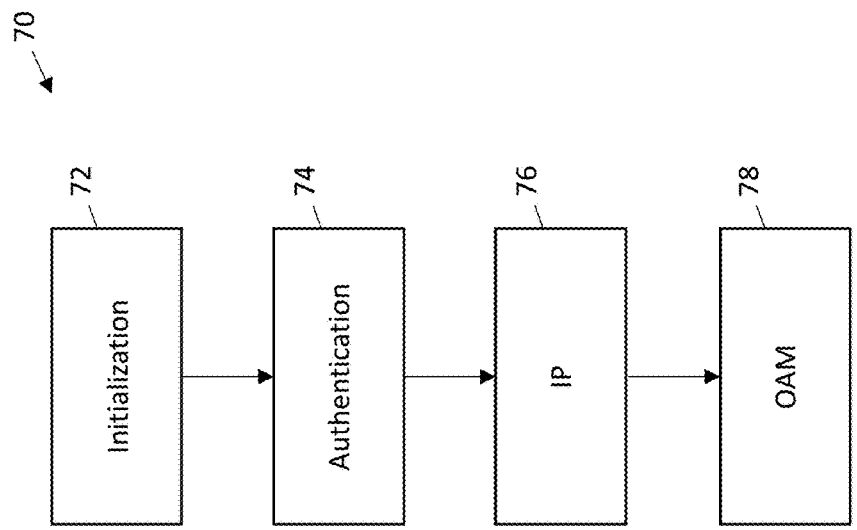
FIG. 5 illustrates a flowchart for provisioning in accordance with one non-limiting aspect of the present invention.

FIG. 5 illustrates a flowchart 70 for a method of provisioning a device via Ethernet frames or other messaging carried over a PON of layer 2 network in accordance with one non-limiting aspect of the present invention. The method is described with respect to an OLT exchanging messages over the PON with an ONU whereby the ONU then provisions the device. The OLT, ONU and/or device may each include a computer readable medium having a plurality of non-transitory instructions operable therewith to facilitate the contemplated operations. A first stage 72 may correspond with topology resolution and physical layer initialization, which may be performed as specified in DPoE-PHYv2.0, which describes the DPoE Network relationship to EPON system specifications. The 1G-EPON specifications were released first in IEEE 802.3ah, while higher speed 10G-EPON specifications were released first in IEEE 802.3ay.

A second stage 74 may correspond with authentication and encryption as specified in DPoE-SECv2.0, which describes how security is implemented in a DPoE Network. A third stage may correspond with IP Initialization 76, which requires the assignment of an IPv4, IPv6, or IPv4 and IPv6 address to a vCM. Depending on the capabilities of the OSSI system, this enables management of the ONU through the vCM. Since the ONU does not contain an IP stack (i.e., not directly addressable using IP), the vCM obtains an IP address and CM configuration file from the OSS provisioning systems, on behalf of the ONU, as part of the registration process. As described in DPoE-OSSIv2.0, the DPoE System may provide management capabilities on behalf of the ONU for all IP-based management functions when the OSS management systems direct management requests to a given D-ONU.

The concept of a virtual Cable Modem (vCM) is used in this specification to represent the IP addressable management entity maintained and controlled within the DPoE System; one vCM is maintained per ONU. The vCM is used to map requirements that were previously required of the DOCSIS Cable Modem to requirements on the DPoE System. When the DPoE System receives management requests destined to a vCM, it checks whether the given management request requires interaction with the ONU. If no interaction is needed the request is handled locally, but if the request requires an extended Operations Administration and Maintenance (eOAM) message exchange 78 between the DPoE System and the ONU, it converts those requests into the appropriate eOAM messages, and sends the eOAM requests to the corresponding D-ONU as needed. See DPoE-OAMv2.0 for a full description of the DPoE OAM messaging. In this manner, the OLT may parse the configuration files and generate OAM messaging for programming the ONU, including identifying TLVs having configuration data, addressing, etc. for subsequent transmission to the device being provisioned.

Optionally, the vCM/OLT may assess whether the device is one of authorized or unauthorized for service. The IP configuration data may be generated to include a null IP address if the device is unauthorized for service whereby the null IP address turns off the device or prevents it from establishing the IP communications. The IP configuration data may be generated to include at least one Dynamic Host Configuration Protocol (DHCP) IP address if the device is authorized for service whereby each DHCP IP address being sufficient for the device to communicate with a corresponding DHCP server in order to establish the IP communications. Other service control authorizations may be similarly undertaken as a function of device specific parameters obtained from the ONU to the OLT, i.e., TLVs may be added, manipulated (off/on) or customized to facilitate vCM or other virtualized control of the device via OAM messaging with the ONU.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A provisioning apparatus for provisioning Internet Protocol (IP) configuration data to a device connected a passive optical network (PON), comprising:
   a processing device; and
   a memory configured to store computer-executable instructions therein, which, when executed by the processing device, cause the provisioning apparatus to:
   download, from a modem server in communication with the PON, a virtual modem configuration file having a plurality of type-length-values (TLVs);
   parse the plurality of TLVs to determine a first TLV associated with instantiating a virtual modem on the provisioning apparatus and a second TLV associated with the IP configuration data; and
   transmit the second TLV to at least one modem in communication with the PON to enable the at least one modem to provision the device with the IP configuration data.

2. The provisioning apparatus of claim 1, comprising an optical line terminal (OLT).

3. The provisioning apparatus of claim 2, wherein the at least one modem includes an optical network unit (ONU).

4. The provisioning apparatus of claim 1, wherein the PON is an Ethernet PON (EPON).

5. The provisioning apparatus of claim 1, wherein the virtual modem is a virtual cable modem (vCM), wherein the virtual modem configuration file is a vCM configuration file, and wherein the modem server is a vCM server.

6. The provisioning apparatus of claim 5, wherein the instructions further cause the provisioning apparatus to (i) download the vCM configuration file using IP packets received over an IP network from the vCM server, and (ii) transmit the second TLV using Ethernet frames sent over the PON to the at least one modem.

7. The provisioning apparatus of claim 1, wherein the instructions further cause the provisioning apparatus to (i) determine a type for each TLV of the plurality of TLVs, and (ii) select the second TLV according to a determined type for the second TLV.

8. The provisioning apparatus of claim 1, wherein the instructions further cause the provisioning apparatus to (i) exchange one or more discovery messages with the at least one modem through the PON, (ii) determine a type identification for the device as a function of information included in the one or more discovery messages, and (iii) select the second TLV to correspond with each TLV of the plurality of TLVs having a type identification matching a type identification specified in the one or more discovery messages.

9. The provisioning apparatus of claim 1, wherein the instructions further cause the provisioning apparatus to (i) determine a type for each TLV of the plurality of TLVs, and (ii) select the second TLV according to an association with a dynamic host configuration protocol (DHCP) server IP address of a DHCP server.

10. An optical line terminal (OLT) for provisioning Internet Protocol (IP) configuration data to a device connected to an Ethernet Passive Optical Network (EPON) through an optical network unit (ONU), the OLT comprising:
 a processing device; and
 a memory configured to store computer-executable instructions therein, which, when executed by the processing device, cause the OLT to:
  download, from a modem server in communication with the PON, a virtual modem configuration file having a plurality of type-length-values (TLVs);
  parse the plurality of TLVs to determine (i) a first TLV associated with instantiating a virtual modem on the OLT, and (ii) a second TLV associated with the IP configuration data; and
  transmit the second TLV through the EPON to the ONU to enable the ONU to provision the device with the IP configuration data.

11. The OLT of claim 10, wherein the virtual modem is a virtual cable modem (vCM), wherein the virtual modem configuration file is a vCM configuration file, and wherein the modem server is a vCM server.

12. The OLT of claim 11, wherein the instructions further cause the OLT to (i) download the vCM configuration file using IP packets obtained from the vCM server, and (ii) transmit the second TLV using Ethernet frames sent over the EPON to the ONU.

13. The OLT of claim 10, wherein the instructions further cause the OLT to transmit the first and second TLVs using one or more Operations Administration and Maintenance (OAM) messages.

14. The OLT of claim 10, wherein the instructions further cause the OLT to determining a type for each TLV of the plurality of TLVs.

15. The OLT of claim 10, wherein the instructions further cause the OLT to select the second TLV from the plurality of TLVs according to the determined type of the second TLV.

* * * * *